(12) United States Patent
Müller et al.

(10) Patent No.: US 10,647,262 B2
(45) Date of Patent: May 12, 2020

(54) ROOFTOP CARGO CARRIER

(71) Applicant: Sortimo International GmbH, Zusmarshausen (DE)

(72) Inventors: Andreas Müller, Augsburg (DE); Jonas Baumeister, Dinkelscherben (DE); Thomas Unger, Dinkelscherben (DE); Bernd Merkle, Scheppach (DE)

(73) Assignee: SORTIMO INTERNATIONAL GMBH, Zusmarshausen (DE)

( * ) Notice: Subject to any disclaimer, the term of this patent is extended or adjusted under 35 U.S.C. 154(b) by 0 days.

(21) Appl. No.: 16/276,232

(22) Filed: Feb. 14, 2019

(65) Prior Publication Data
US 2019/0248295 A1 Aug. 15, 2019

(30) Foreign Application Priority Data

Feb. 15, 2018 (DE) .................. 10 2018 103 435

(51) Int. Cl.
B60R 9/042 (2006.01)
(52) U.S. Cl.
CPC ............ *B60R 9/0423* (2013.01); *B60R 9/042* (2013.01)
(58) Field of Classification Search
CPC ....... B60R 9/042; B60R 9/0423; B60R 9/045; B60R 9/048; B60P 3/105
USPC ....................................................... 224/310
See application file for complete search history.

(56) References Cited

U.S. PATENT DOCUMENTS 5,417,358 A * 5/1995 Haselgrove ............. B60R 9/042
224/310
5,690,259 A * 11/1997 Montani ................. B60R 9/042
224/310
5,884,824 A    3/1999 Spring
6,338,427 B1 * 1/2002 Aftanas .................. B60R 9/042
224/309
7,770,953 B2 * 8/2010 Koarai ...................... B60R 7/04
296/24.34
9,630,565 B2    4/2017 Gallagher
(Continued)

FOREIGN PATENT DOCUMENTS

GB        2454680 A        5/2009

OTHER PUBLICATIONS

Result of Examination Report for DE 10 2018 103 435.0, filed Feb. 15, 2018.

*Primary Examiner* — Adam J Waggenspack
(74) *Attorney, Agent, or Firm* — Paul D. Bianco; Fleit Intellectual Property Law

(57) ABSTRACT

A rooftop cargo carrier having a rack that can be mounted on the roof of an automotive vehicle and on which a linear rail is disposed, along which linear rail a support structure for an object to be transported can be moved between a transport position, in which the support structure is disposed above the linear rail, and an intermediate position, in which the support structure is disposed on the side as an extension of the linear rail. The configuration comprising the linear rail and the support structure can be pivoted between the intermediate position and a loading position, in which the linear rail and the support structure are disposed at a blunt angle relative to the rack. The rooftop cargo carrier also includes a retainer that allows joint pivoting movement of the linear rail and the support structure relative to the rack only after the intermediate position has been reached.

8 Claims, 4 Drawing Sheets

(56) References Cited

U.S. PATENT DOCUMENTS

| | | | |
|---|---|---|---|
| 9,914,400 B1* | 3/2018 | Johnsrud | B60R 9/042 |
| 10,486,608 B2* | 11/2019 | Levi | B60R 9/0423 |
| 2018/0162288 A1* | 6/2018 | Sautter | B60R 9/042 |

* cited by examiner

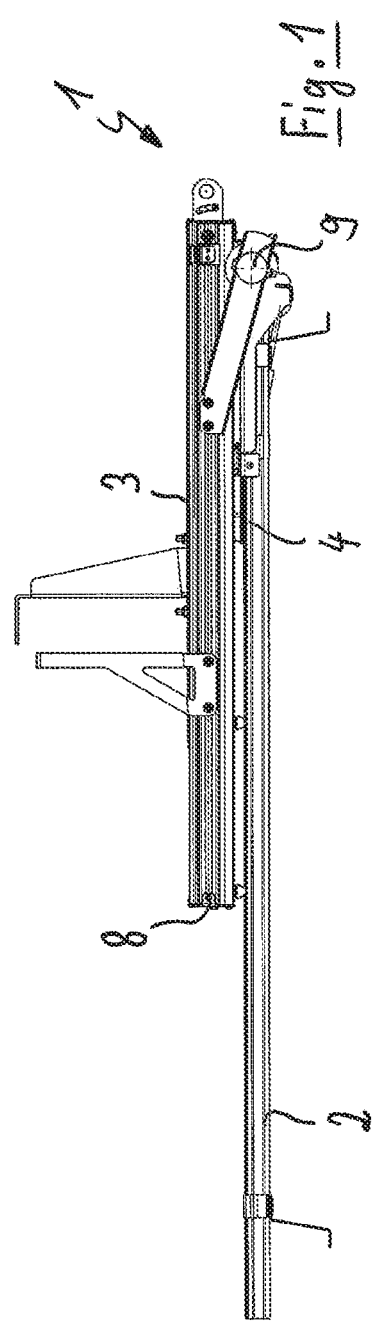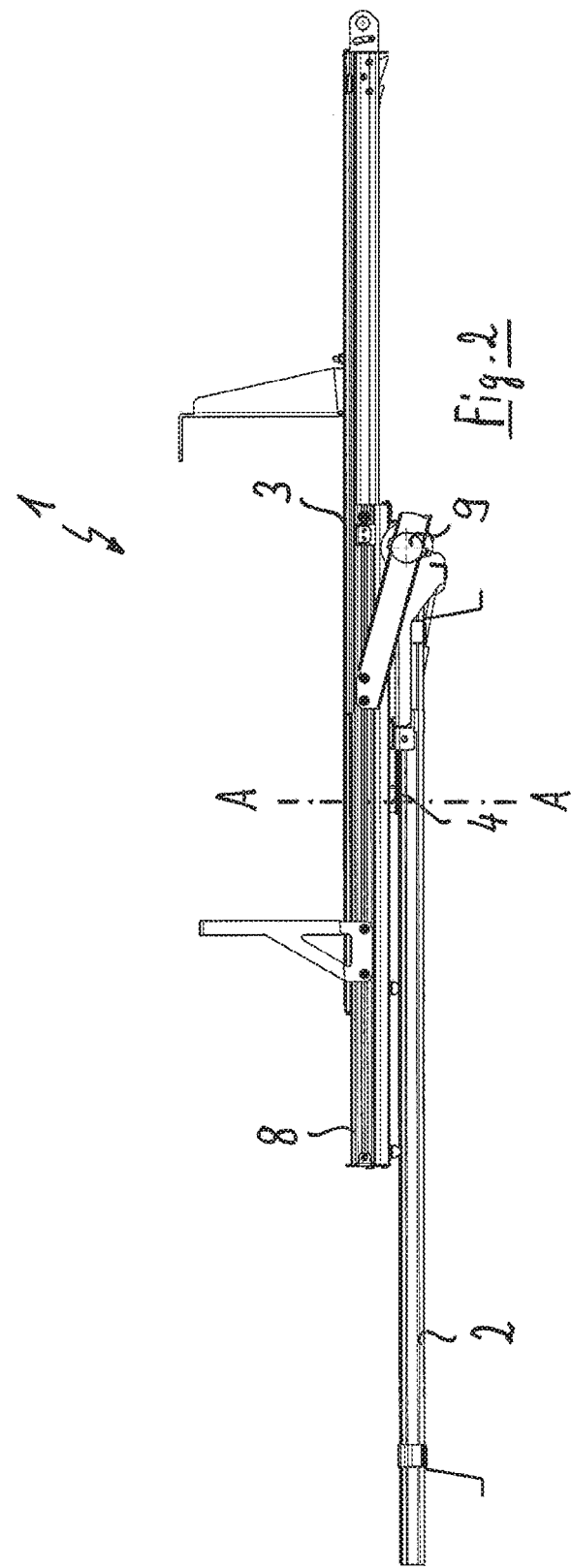

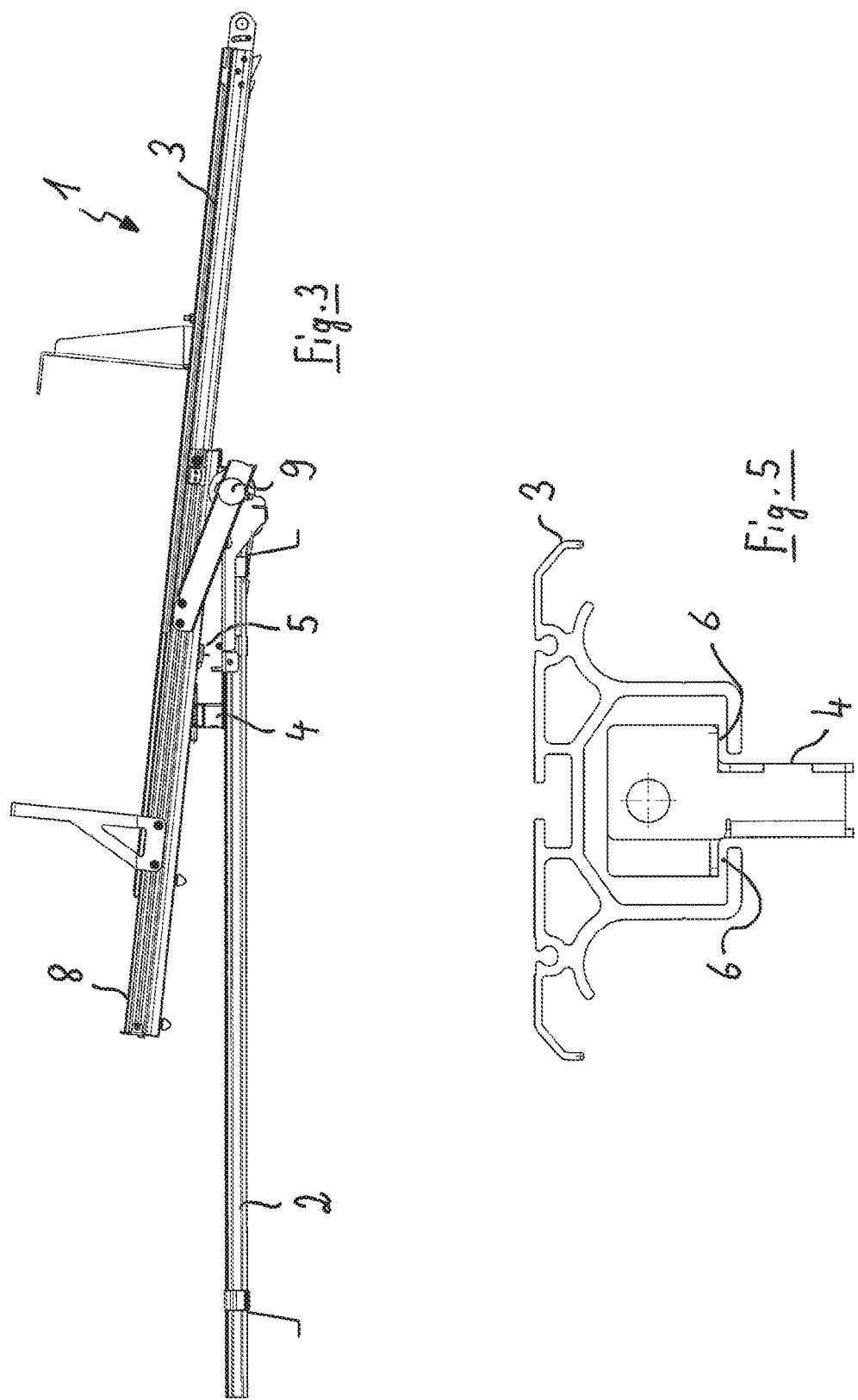

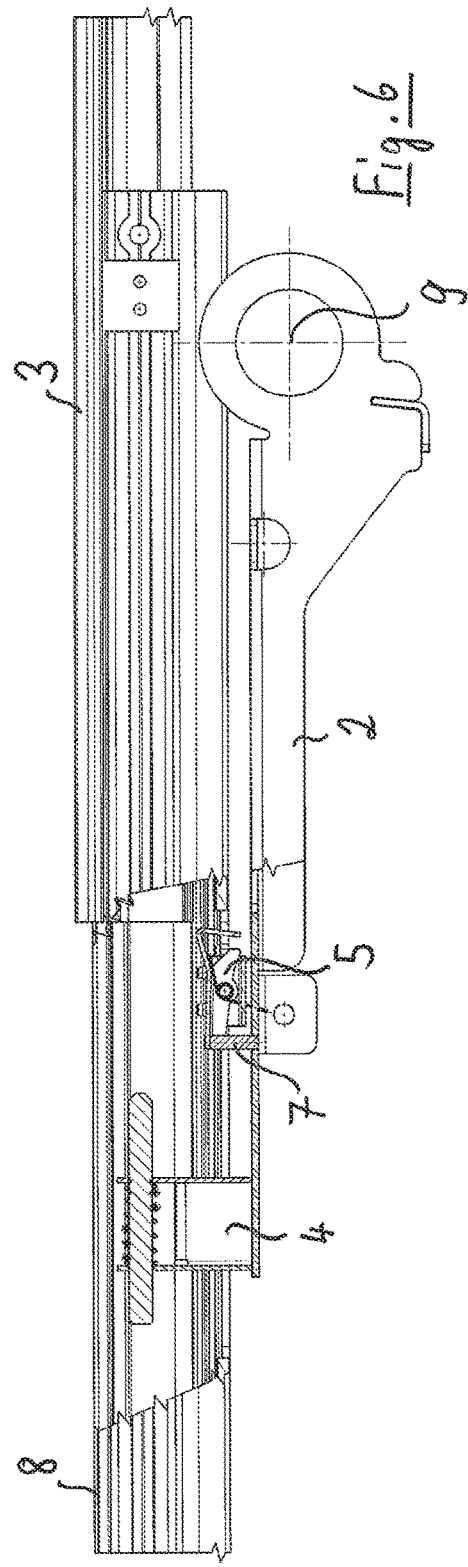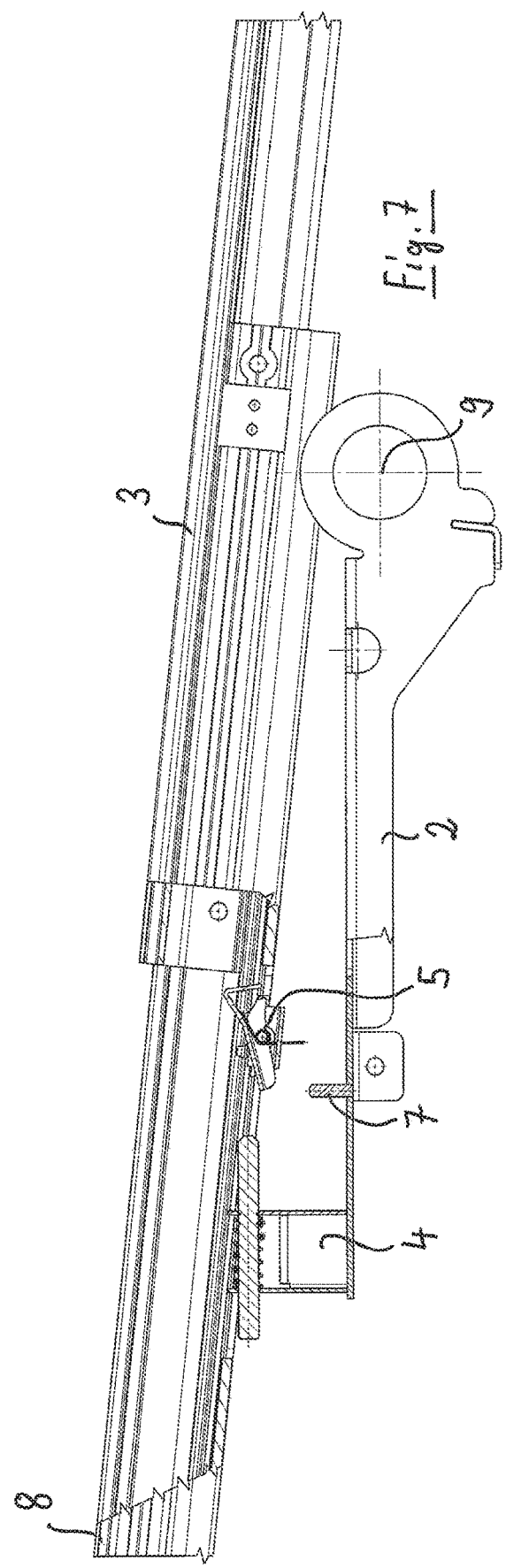

US 10,647,262 B2

ROOFTOP CARGO CARRIER

FIELD OF THE INVENTION

The present invention relates to a rooftop cargo carrier.

BACKGROUND

This type of rooftop cargo carrier serves predominantly to transport objects, in particular ladders, on the roof of a vehicle. Because of the bulk and unwieldiness of ladders, problems of stowing ladders within the transporting space of the vehicle arise.

U.S. Pat. No. 5,884,824 A discloses a so-called ladder lift that is mounted by means of carrier rails on the roof of a vehicle. The ladder lift comprises two slide rails extending parallel to each other, which slide rails can be telescopically extended outwardly in the horizontal direction, with the slide rails at one end being disengaged from their lock-in position. This allows the slide rails, along with the guide frame, to be pivoted about an axis of rotation.

U.S. Pat. No. 9,630,565 B2 discloses a loading system for loading an object on and unloading it from the roof of a vehicle, with the loading system comprising a base frame for connection to the vehicle. The loading system also comprises a stowage frame that is connected to the base frame and that can be pivoted about an axis of rotation relative to the base frame. The stowage frame comprises an idler link that is arranged so as to be able to rotate about an idler axis relative to the base frame.

U.S. Pat. No. 9,914,400 B1 discloses a rooftop cargo carrier comprising a rack that can be mounted on the roof of an automotive vehicle and on which a linear guide is disposed, along which linear guide a support structure for an object to be transported can be moved between a transport position and an intermediate position, with the configuration comprising the linear guide and the support structure being able to pivot between the intermediate position and a loading position in which the linear guide and the support structure are disposed at a blunt angle relative to the rack. Also provided is a retaining means for jointly pivoting the linear guide and the support structure relative to the rack only after the intermediate position has been reached.

GB 2 454 680 A1 discloses a ladder lift comprising two sliding rails and a frame, wherein the two sliding rails in the frame of the ladder lift can be moved outwardly. When the two sliding rails are in the outwardly extended position, they can be pivoted downwardly.

SUMMARY

One aspect of the disclosure relates to a generic device to ensure the safe and convenient transport of ladders and other long objects.

Other embodiments are also disclosed.

BRIEF DESCRIPTION OF THE DRAWINGS

A practical example of the invention will be explained in greater detail below with reference to the accompanying drawings. These drawings show:

FIG. 1: a front view of a rooftop cargo carrier according to the present invention in a transport position;

FIG. 2: a view of the rooftop cargo carrier shown in FIG. 1 in an intermediate position prior to the start of the pivoting movement;

FIG. 3: a representation of the rooftop cargo carrier shown in FIG. 2 in the intermediate position following the start of the pivoting movement;

FIG. 5: a cross-section along line A-A of FIG. 1;

FIG. 6: an enlarged representation of the view seen in FIG. 2, not showing the linear rail, but showing only the support structure;

FIG. 7: an enlarged representation of FIG. 3, not showing the linear rail, but showing only the support structure.

DETAILED DESCRIPTION

Figure 4:
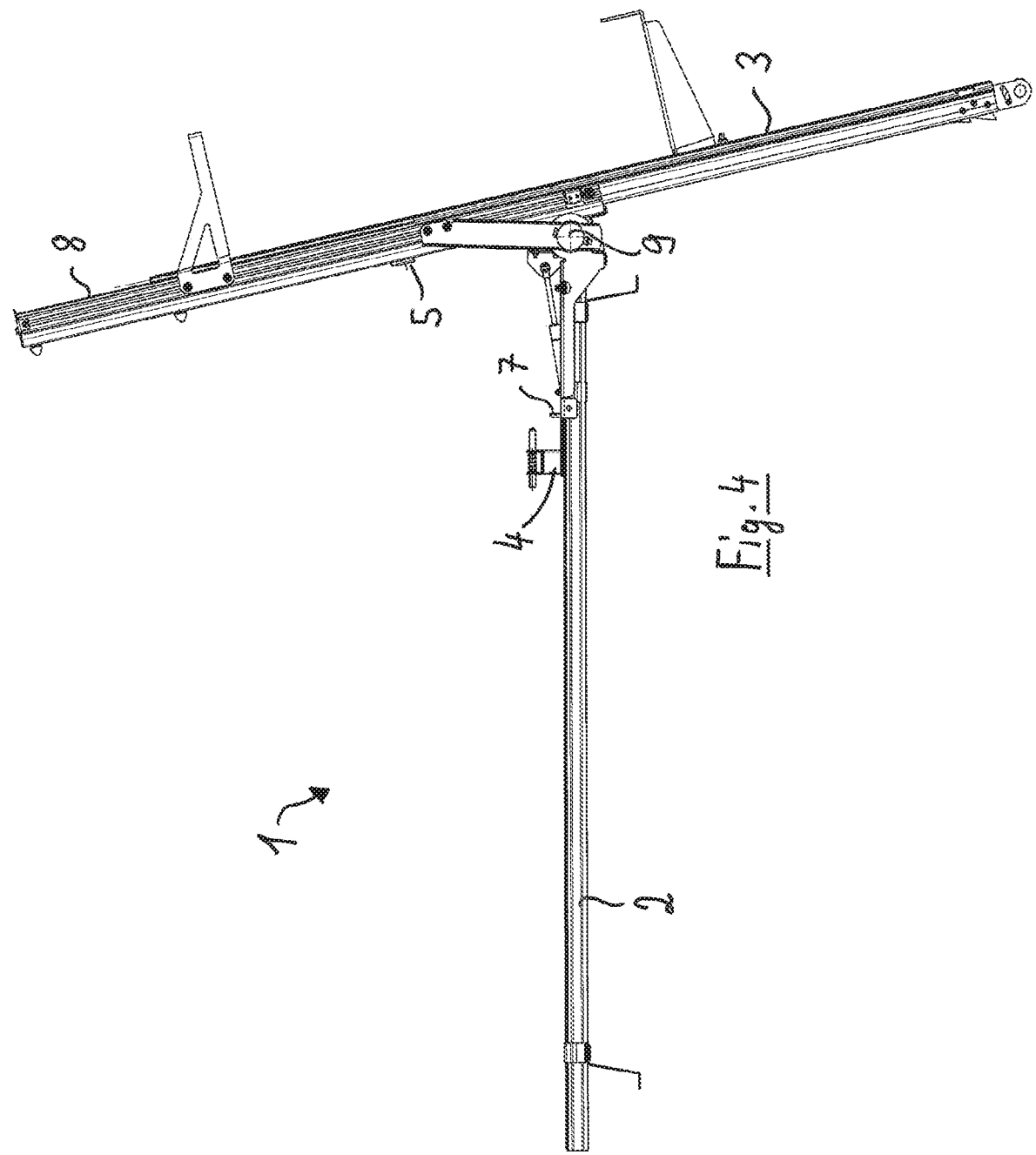
FIG. 4: a representation of the rooftop cargo carrier shown in FIGS. 1 to 3 in a loading position.

FIGS. 1 and 2 show a linear rail 8 that can be mounted via a rack 2 on the roof of an automotive vehicle, along which linear rail 8 a support structure 3 for the object to be transported, for example, a ladder, can be slidingly moved. The support structure 3 as well as the linear rail 8 is a profile, especially an aluminum or steel profile. The connection between the support structure 3 and the linear rail 8 is designed to ensure that only a sliding movement, but not a tilting movement, between the support structure 3 and the linear rail 8 is made possible. As a result, the support structure 3 and the linear rail 8 are invariably colinear, i.e., in each of the positions discussed below.

The linear rail 8 is disposed on a rack 2 that is secured by means of securing means known in the art on the roof of an automotive vehicle. These securing means can be permanently secured by screwing the rack to the roof of the automotive vehicle or they can be temporarily secured in that the rack can be screwed to the roof, e.g., to a roof railing or to drip rails on the roof.

As FIG. 3 indicates, an upwardly extending tubular section 4 in the form of a rectangular tube is stationarily secured to the rack 2, which rectangular tube reaches through an opening in the linear rail 8. At its two oppositely lying ends that, relative to the transverse direction as seen when looking in the travel direction of the vehicle, extend outwardly, the tubular section 4, details of which are shown in FIG. 5, has two projections 6.

A lug 7 extending upwardly from the tubular section 4, as seen when looking in the direction of the outside of the vehicle, is disposed on the rack.

In the transport position shown in FIGS. 1 and 5, the profile of the support structure 3 engages the projections on the tubular section 4 from below, thereby making it impossible for the linear rail 8 to pivot relative to the rack 2 because the linear rail 8 and the support structure 3 are colinearly connected to each other by means of profiles that are matched to each other.

Disposed on the linear rail 8 next to the opening for the tubular section 4 in the direction of the outside of the vehicle is a rocker 5 that, when in the transport position shown in FIG. 2, is pushed downwardly in that the left side of the rocker, as shown in the drawing, rests on the lug 7, which causes the side of the rocker 5 shown on the right side of the figure to be pushed downwardly because the pivot axis of the rocker 5 is disposed in between and oriented in the longitudinal direction of the vehicle. In this manner, the rocker 5 can be engaged from above by the profile of the support structure 3, which profile, in the transport position, is disposed above the rocker 5 as well as above the tubular section 4.

To move from the transport position shown in FIG. 1 to the intermediate position shown in FIGS. 2 and 3, the support structure 3 is pulled outwardly by means of a handle (not shown), which releases first the tubular section 4 and subsequently the rocker 5. However, because the rocker 5 is blocked by the lug 7 on the tubular section 4, the rocker initially does not yet move. After the profile of the support structure 3 has been pulled over the projections 6 of the tubular section 4, the support structure 3, along with the linear rail 8, can be tilted about the axis of rotation 9, which is oriented in the longitudinal direction of the vehicle. This corresponds to the intermediate position shown in FIG. 2. The configuration comprising the linear rail 8 and the support structure 3 can subsequently be tilted downwardly via the slightly tilted position shown in FIG. 3 to the loading position shown in FIG. 4, in which case the configuration comprising the linear rail 8 and the support structure 3 is nearly vertically oriented in the upward direction.

By subsequently moving the configuration comprising the linear rail 8 and the support structure 3 from the loading position back in the direction of the intermediate position, the rocker 5 thereby actuated prevents the support structure 3 from being pushed farther on the linear rail 8 because the rocker projects upwardly as long as the linear rail 8, relative to the rack 2, is in an angled position. Only once the configuration comprising the linear rail 8 and the support structure 3 has been pushed downwardly to the point that the linear rail 8 is again disposed completely horizontally on the rack 2 is the left side of the rocker 5 actuated by the lug 7, and the right side pivots downwardly and thus unblocks the path for pushing the support structure 3 farther on the linear rail 8. The support structure 3 can subsequently be easily pushed over the rocker 5 and the tubular section 4, and the profile of the support structure 3 again engages the projections 6 of the tubular section 4 from below. This prevents the configuration from being tipped over again.

To prevent the support structure 3 in the transport position shown in FIG. 1 from accidentally slipping out of position relative to the linear rail 8, the rooftop cargo carrier according to the present invention has a securing hook disposed near the handle. This hook is an annular spring-loaded hook that, when the support structure 3 is completely pushed into the linear rail 8, is pushed over a counterplate having a recess, with the barbed hook of the securing hook engaging in the recess and remaining in this position by means of the spring force.

To release the securing hook, the hook must be manually pivoted upwardly against the force of the annular spring. Because the barbed hook engages in the opening stationarily disposed in the linear rail, the support structure must be pushed slightly toward the middle of the vehicle by means of the handle. The support structure can subsequently be pulled outwardly by means of the handle.

The rooftop cargo carrier according to the present invention is preferably part of a rooftop cargo carrier configuration that comprises two rooftop cargo carriers of the same type, wherein the two rooftop cargo carriers of the configuration can be mounted on the roof of an automotive vehicle and jointly hold the long objects to be transported.

The invention claimed is:

1. A rooftop cargo carrier comprising a rack mountable on a roof of an automotive vehicle and on which a linear rail is disposed, along which linear rail a support structure for an object to be transported is movable between a transport position, in which the support structure is disposed above the linear rail, and an intermediate position, in which the support structure is disposed on a side as an extension of the linear rail, and the configuration comprising the linear rail and the support structure is pivotable between the intermediate position and a loading position, in which the linear rail and the support structure are disposed at a blunt angle relative to the rack, wherein a retainer allows joint pivoting movement of the linear rail and the support structure relative to the rack only after the intermediate position has been reached.

2. The rooftop cargo carrier of claim 1, wherein the retainer is designed in the form of a tubular section disposed on the rack, which tubular section passes through an opening in the linear rail and comprises, on an upper end, outwardly extending projections that, in the transport position and during movement from the transport position into the intermediate position, are engaged from below by a mating profile of the support structure.

3. The rooftop cargo carrier of claim 1, wherein a rocker disposed on the linear rail, which rocker prevents movement of the support structure relative to the linear rail from the loading position into the transport position until the intermediate position is reached, allows said movement only after the configuration comprising the linear rail and the support structure is fully at rest on the rack.

4. The rooftop cargo carrier of claim 3, wherein the rocker is disposed on the linear rail next to the opening for the tubular section, as seen when looking in the direction of the outside of the vehicle.

5. The rooftop cargo carrier of claim 4, wherein the rocker, when tilting the configuration comprising the linear rail and the support structure into the transport position, rests on a lug disposed on the rack actuating the rocker and thereby allows the support structure to be pushed farther on the linear rail.

6. The rooftop cargo carrier of claim 1, wherein the support structure comprises a handle for the actuation thereof.

7. The rooftop cargo carrier of claim 6, wherein the handle comprises a securing hook for protection against accidental actuation.

8. A rooftop cargo carrier configuration comprising at least two rooftop carriers of claim 1, wherein each of the at least two rooftop carriers is mounted at a distance from each other on a roof of an automotive vehicle.

\* \* \* \* \*